(12) United States Patent
Herrera

(10) Patent No.: US 10,101,597 B1
(45) Date of Patent: Oct. 16, 2018

(54) PERIPHERAL VIEW BLOCKING SYSTEM

(71) Applicant: Victoria Herrera, Montclair, NJ (US)

(72) Inventor: Victoria Herrera, Montclair, NJ (US)

( * ) Notice: Subject to any disclaimer, the term of this patent is extended or adjusted under 35 U.S.C. 154(b) by 0 days.

(21) Appl. No.: 15/426,541

(22) Filed: Feb. 7, 2017

(51) Int. Cl.
G02C 7/16 (2006.01)
G02C 11/00 (2006.01)
G02C 5/14 (2006.01)
G02C 5/02 (2006.01)
G02C 5/12 (2006.01)

(52) U.S. Cl.
CPC ............... *G02C 7/16* (2013.01); *G02C 5/02* (2013.01); *G02C 5/12* (2013.01); *G02C 5/146* (2013.01); *G02C 11/00* (2013.01)

(58) Field of Classification Search
CPC ... G02C 7/16; G02C 5/12; G02C 5/02; G02C 11/00; G02C 5/146
USPC .............................................. 351/41, 44, 45
See application file for complete search history.

(56) References Cited

U.S. PATENT DOCUMENTS

| 4,057,852 A * | 11/1977 | Contant | A61F 9/045 2/12 |
| 4,298,991 A | 11/1981 | Recenello | |
| D374,451 S | 10/1996 | Gurwin | |
| 5,877,837 A * | 3/1999 | Hayes | G02C 7/16 2/13 |
| 6,275,998 B1 | 8/2001 | Tromble | |
| 7,322,693 B2 | 1/2008 | Abraham | |
| 2011/0075092 A1* | 3/2011 | Nordyke | G02C 7/12 351/45 |
| 2012/0329583 A1 | 12/2012 | Farris | |
| 2014/0071398 A1 | 3/2014 | Glassco | |

FOREIGN PATENT DOCUMENTS

WO 0112048 A1 2/2001

* cited by examiner

Primary Examiner — Tuyen Tra
(74) Attorney, Agent, or Firm — Kyle A. Fletcher, Esq.

(57) ABSTRACT

The peripheral view blocking system is an optical device. The peripheral view blocking system blocks the peripheral sight lines of a wearer. The purpose of blocking peripheral sight lines is to prevent distractions caused by actions and light that may be seen peripherally. The blocking of peripheral sight lines is a commonly used strategy in several activities including, but not limited to, target based activities such as plein air painting, bowling or the shooting of firearms. The peripheral view blocking system comprises a front lens, a left blinder, a right blinder, and a nose frame. The left blinder attaches to the front lens. The right blinder attaches to the front lens. The nose frame attaches the left blinder to the right blinder.

18 Claims, 3 Drawing Sheets

PERIPHERAL VIEW BLOCKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of optical instruments, more specifically, an accessory configured for use optical elements and optical systems including other optical apparatus.

SUMMARY OF INVENTION

The peripheral view blocking system is an optical device. The peripheral view blocking system blocks the peripheral sight lines of a wearer. The purpose of blocking peripheral sight lines is to prevent distractions caused by actions and light that may be seen peripherally. The blocking of peripheral sight lines is a commonly used strategy in several activities including, but not limited to, target based activities such as plein air artwork, bowling or the shooting of firearms. The peripheral view blocking system comprises a translucent or colored removable front lens, a left blinder, a right blinder, and a nose frame. The left blinder attaches to the front lens. The right blinder attaches to the front lens. The nose frame attaches the left blinder to the right blinder.

These together with additional objects, features and advantages of the peripheral view blocking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the peripheral view blocking system in detail, it is to be understood that the peripheral view blocking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the peripheral view blocking system.

It is therefore important that the claims be regarded as including such equivalent construction insofar as they do not depart from the spirit and scope of the peripheral view blocking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
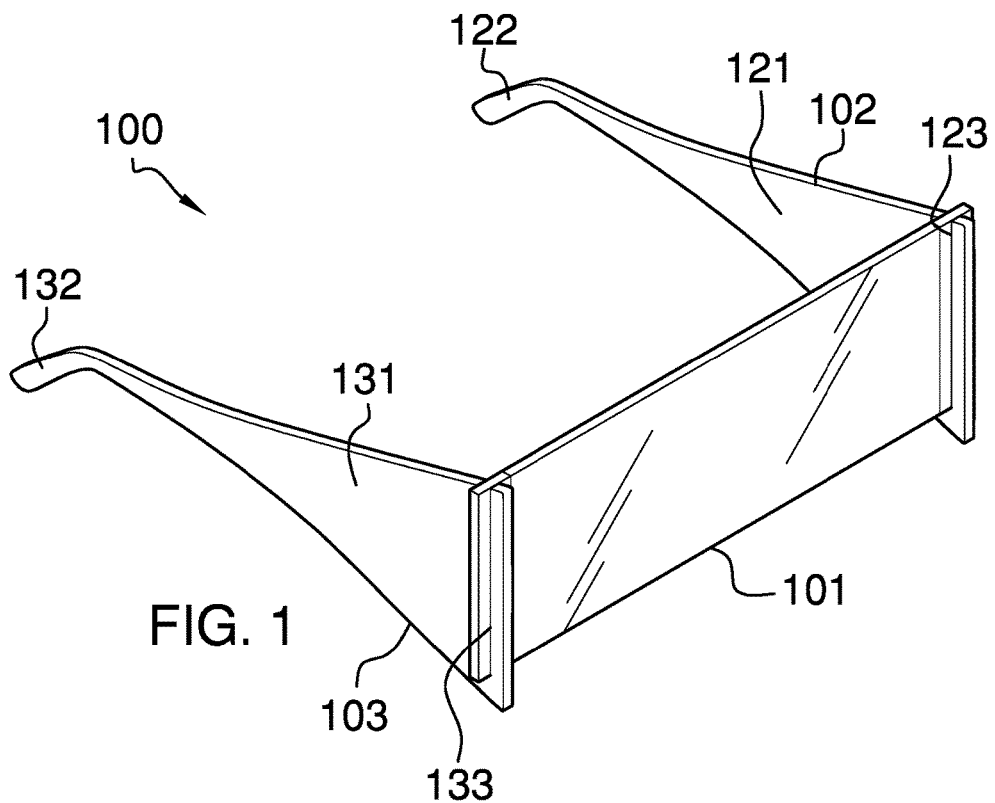
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration" Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The peripheral view blocking system 100 (hereinafter invention) is an optical device. The invention 100 blocks the peripheral sight lines of a wearer. The purpose of blocking peripheral sight lines is to prevent distractions caused by light and actions that may be seen peripherally. The blocking of peripheral sight lines is a commonly used strategy in several activities including, but not limited to, target based activities such as artwork, bowling or the shooting of firearms. The invention 100 comprises a front lens 101, a left blinder 102, a right blinder 103, and a nose frame 104. The left blinder 102 attaches to the front lens 101. The right blinder 103 attaches to the front lens 101. The nose frame 104 attaches the left blinder 102 to the right blinder 103.

The front lens 101 is a translucent structure that permits forward vision by the wearer. The front lens 101 comprises a translucent plate 111. The translucent plate 111 is a translucent rectangular plate structure that is placed in front of the face of the wearer. The translucent plate 111 is further defined with a plate width 112, a plate height 113, and a temple span 114. The front lens 101 may have optical properties including, but not limited to, UV filtering, a polarizing filter, or a tint that only allows the passage of light of a previously determined range of wavelengths.

The plate width 112 is the horizontal span of the translucent plate 111 that runs perpendicularly to the superior-inferior axis of the body when the invention 100 is worn normally. The translucent plate 111 is perpendicular to both the left blinder 102 and the right blinder 103 during normal use of the invention 100.

The plate height 113 is the vertical span of the translucent plate 111 that runs in a direction parallel to the superior-inferior axis of the body when the invention 100 is worn normally. The direction of the plate height 113 is perpendicular to the direction of the plate width 112.

The temple span 114 is defined elsewhere in this disclosure.

The left blinder 102 is a side piece that is attached to the front lens 101 along the left side of the wearer. The left blinder 102 is an opaque plate structure that prevents the wearer from seeing objects from the left side of the wearer. The left blinder 102 mounts the invention 100 on the left ear of the wearer. The left blinder 102 comprises a left temple 121, a left temple tip 122, and a left temple slot 123.

Figure 2:
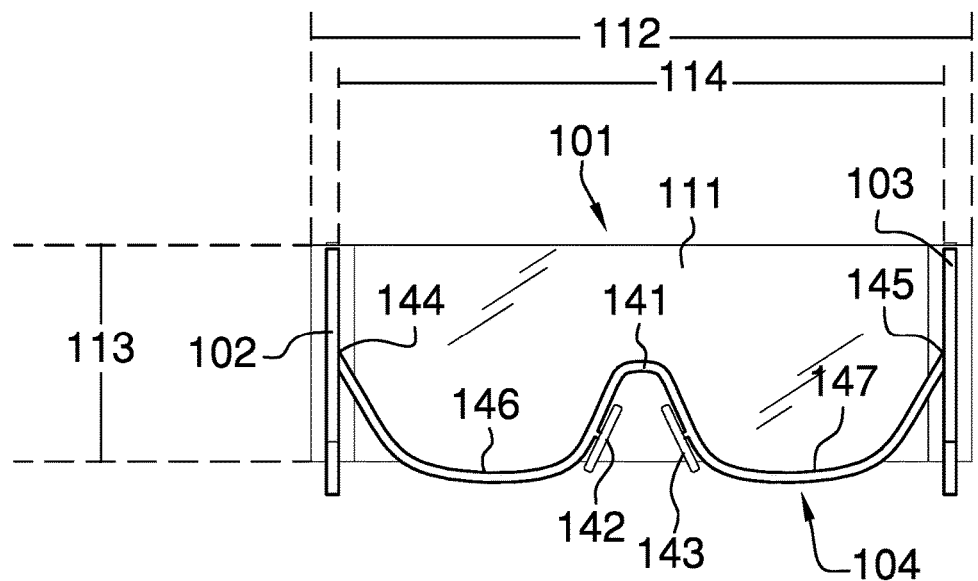
FIG. 2 is a back view of an embodiment of the disclosure.
Figure 3:
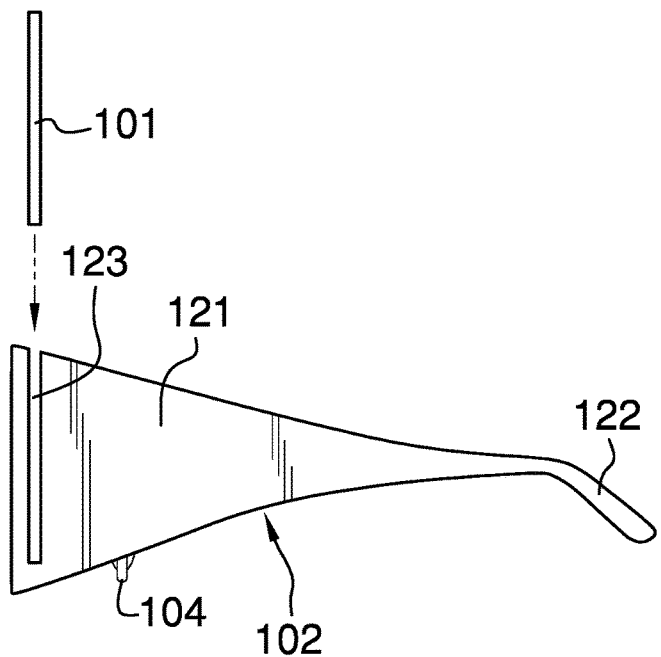
FIG. 3 is a side view of an embodiment of the disclosure.
Figure 4:
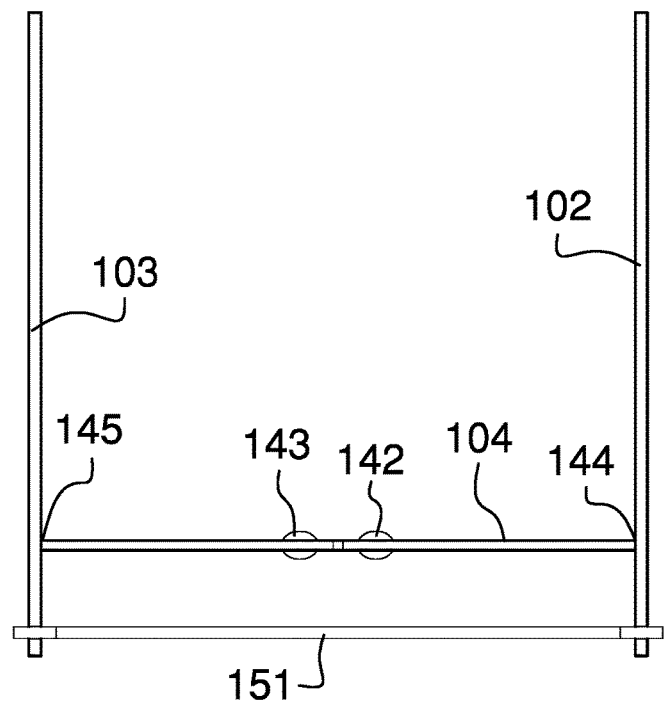
FIG. 4 is a top view of an embodiment of the disclosure.
Figure 5:
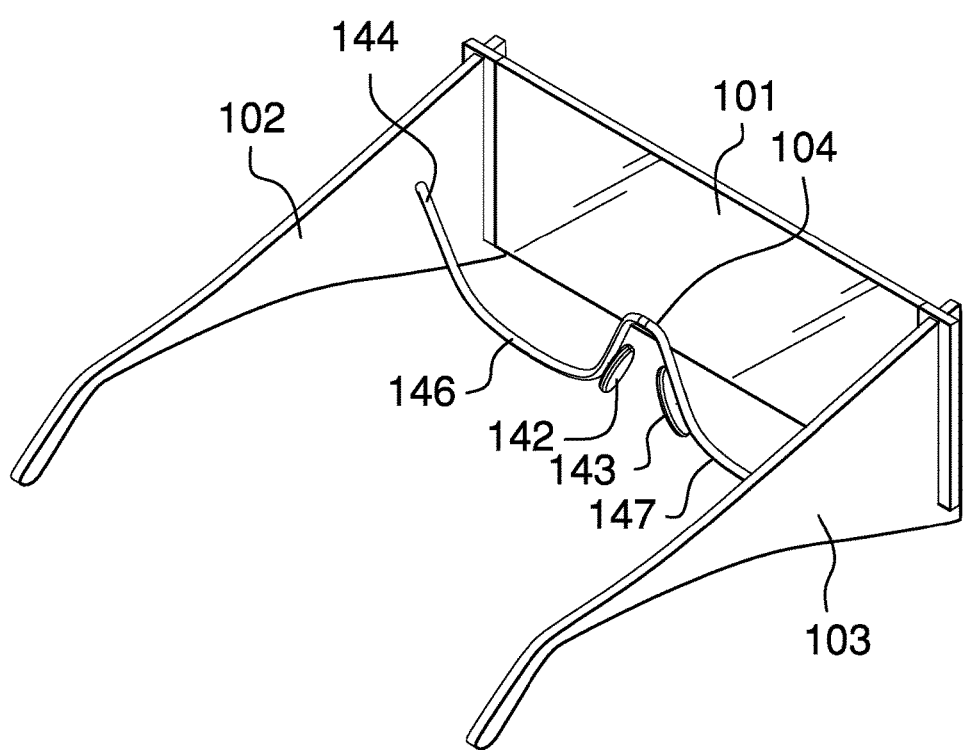
FIG. 5 is a reverse perspective view of an embodiment of the disclosure.

As shown most clearly in FIG. 2, the left temple 121 is the frustum of a triangular structure wherein a vertex of the triangular structure is removed. The line removing the vertex of the triangular structure is parallel to the edge of the triangular structure that is distal from the vertex of the triangular structure that is removed. The left temple tip 122 is a rectilinear structure that is attached to the line that removes the vertex of the left temple 121. The left temple tip 122 projects away from the left temple 121 in a direction away from the translucent plate 111 and in a direction towards the inferior direction of the wearer.

The purpose of the left temple 121 and the left temple tip 122 is to rest on the ear in the space between the helix of the outer ear and the skull such that the invention 100 is supported on the head of the wearer.

The left temple slot 123 is an aperture that is formed through the left temple 121 in a direction that is parallel to the direction of the plate height 113. The left temple slot 123 runs from the superior edge of the left temple 121 towards the inferior edge of the left temple 121. As shown most clearly in FIG. 3, the left temple slot 123 does not go through the inferior edge of the left temple 121.

The right blinder 103 is a side piece that is attached to the front lens 101 along the right side of the wearer. The right blinder 103 is an opaque plate structure that prevents the wearer from seeing objects from the right side of the wearer. The right blinder 103 mounts the invention 100 on the right ear of the wearer. The right blinder 103 comprises a right temple 131, a right temple tip 132, and a right temple slot 133.

As shown most clearly in FIG. 2, the right temple 131 is the frustum of a triangular structure wherein a vertex of the triangular structure is removed. The line removing the vertex of the triangular structure is parallel to the edge of the triangular structure that is distal from the vertex of the triangular structure that is removed. The right temple tip 132 is a rectilinear structure that is attached to the line that removes the vertex of the right temple 131. The right temple tip 132 projects away from the right temple 131 in a direction away from the translucent plate 111 and in a direction towards the inferior direction of the wearer.

The purpose of the right temple 131 and the right temple tip 132 is to rest on the ear in the space between the helix of the outer ear and the skull such that the invention 100 is supported on the head of the wearer.

The right temple slot 133 is an aperture that is formed through the right temple 131 in a direction that is parallel to the direction of the plate height 113. The right temple slot 133 runs from the superior edge of the right temple 131 towards the inferior edge of the right temple 131. As shown most clearly in FIG. 3, the right temple slot 133 does not go through the inferior edge of the right temple 131.

In the first potential embodiment of the disclosure, the left blinder 102 and the right blinder 103 are identical structures.

The nose frame 104 mounts the invention 100 on the nose of the wearer. The nose frame 104 is a structure that is attached to both the left blinder 102 and the right blinder 103. The nose frame 104 comprises a bridge 141, a left nose pad 142, and a right nose pad 143.

The bridge 141 is a structure that: 1) attaches the left blinder 102 to the right blinder 103; and, 2) rests upon the nose of the wearer such that the bulk of the weight of the invention 100 is supported by the nose of the wearer. The bridge 141 is further defined with a left end 144 and a right end 145. The left end 144 and the right end 145 further forms the left end 144 and the right end 145 of the overall nose frame 104. The left end 144 is the end of the bridge 141 that attaches to the left blinder 102. The right end 145 is the end of the bridge 141 that attaches to the right blinder 103.

The bridge 141 is a linear structure formed from a rigid material. As shown most clearly in FIG. 2, the bridge 141 is formed with a left arcuate 146 and a right arcuate 147. The left arcuate 146 is an arcuate curvature that bends the bridge 141 below the left eye of the wearer such that the left arcuate 146 will not interfere with the forward vision of the wearer. The right arcuate 147 is an arcuate curvature that bends the bridge 141 below the right eye such that the right arcuate 147 will not interfere with the forward vision of the wearer.

The left nose pad 142 is a readily and commercially available nose pad that are commonly used with eyeglasses. It is preferred that a silicon nose pad be used. The left nose pad 142 is attached to the bridge 141 such that the left nose pad 142 will rest on the nose of the wearer.

The right nose pad 143 is a readily and commercially available nose pad that are commonly used with eyeglasses. It is preferred that a silicon nose pad be used. The right nose pad 143 is attached to the bridge 141 such that the right nose pad 143 will rest on the nose of the wearer.

To assemble the invention 100, the translucent plate 111 is inserted into the left temple slot 123 of the left temple 121 such that the sense of direction of the plate width 112 of the translucent plate 111 is perpendicular to the left temple 121. The translucent plate 111 is inserted into the right temple slot 133 of the right temple 131 such that the sense of direction of the plate width 112 of the translucent plate 111 is perpendicular to the right temple 131.

The temple span 114 is an adjustable span of the distance in the direction of the plate width 112 between the left blinder 102 and the right blinder 103.

The left blinder 102 and the right blinder 103 are positioned on the translucent plate 111 such that the temple span 114 is greater than the span of the head of the wearer such that the invention 100 can be mounted on the nose of the ears of the wearer. The position of the left blinder 102 and the right blinder 103 on the translucent plate 111 is adjustable by sliding the left blinder 102 and the right blinder 103 along the plate width 112 of the translucent plate 111.

The following definitions were used in this disclosure:

Arcuate: As used in this disclosure, arcuate describes the curve formed by a bent bow.

Frustum: As used in this disclosure, a frustum is a portion of a geometric planar structure that lies between two parallel planes that intersect with the geometric planar structure.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, inferior refers to a directional sense or location of the body. Specifically, inferior refers to an object or a side of an object that is proximal to the feet or distal from the head of the body.

Opaque: As used in this disclosure, opaque refers to an object or material that prevents the passage of radiation through the object or material.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance.

Slot: As used in this disclosure, a slot is a long narrow groove or aperture that is formed in an object.

Superior: As used in this disclosure, superior refers to a directional sense or location of the body. Specifically, superior refers to an object or a side of an object that is distal from the feet or proximal to the head of the body.

Translucent: As used in this disclosure, translucent refers to an object or material that allows light to past through the material without significant scattering such that an object can be clearly seen through the object or material.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

UV: As used in this disclosure, UV is an abbreviation for ultraviolet.

Vertex: As used in this disclosure, a vertex (plural vertices) is an angle that is formed by two lines that form a point. Vertices are commonly found in polygons.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An optical device comprising:
a front lens, a left blinder, a right blinder, and a nose frame;
wherein the left blinder attaches to the front lens;
wherein the right blinder attaches to the front lens;
wherein the front lens is removable with respect to the left blinder and the right blinder;
wherein the nose frame attaches the left blinder to the right blinder;
wherein the optical device blocks the peripheral sight lines of the optical device;
wherein the optical device is further defined with an inferior direction and a superior direction;
wherein the front lens is a translucent structure that permits forward vision;
wherein the front lens comprises a translucent plate;
wherein the translucent plate is a translucent rectangular plate structure;
wherein the translucent plate is further defined with a plate width, a plate height, and a temple span;
wherein plate width of the translucent plate is perpendicular to both the left blinder and the right blinder.

2. The optical device according to claim 1
wherein the left blinder is a side piece that is attached to the front lens;
wherein the right blinder is a side piece that is attached to the front lens.

3. The optical device according to claim 2
wherein the left blinder is an opaque plate structure;
wherein the right blinder is an opaque plate structure.

4. The optical device according to claim 3
wherein the left blinder comprises a left temple, a left temple tip, and a left temple slot;
wherein the left temple tip attaches to the left temple;
wherein the left temple slot is formed in the left temple;
wherein the left temple attaches to the translucent plate;
wherein the right blinder comprises a right temple, a right temple tip, and a right temple slot;
wherein the right temple tip attaches to the right temple;
wherein the right temple slot is formed in the right temple;
wherein the right temple attaches to the translucent plate.

5. The optical device according to claim 4
wherein the left temple is the frustum of a left triangular structure wherein a vertex of the left triangular structure is removed;
wherein the line removing the vertex of the triangular structure is parallel to the edge of the left triangular structure that is distal from the vertex of the left triangular structure that is removed;
wherein the right temple is the frustum of a right triangular structure wherein a vertex of the right triangular structure is removed;
wherein the line removing the vertex of the triangular structure is parallel to the edge of the right triangular structure that is distal from the vertex of the right triangular structure that is removed.

6. The optical device according to claim 5
wherein the left temple tip is a rectilinear structure that is attached to the line that removes the vertex of the left temple;
wherein the right temple tip is a rectilinear structure that is attached to the line that removes the vertex of the right temple.

7. The optical device according to claim 6
wherein the left temple tip projects away from the left temple in a direction away from the translucent plate and in a direction towards the inferior direction;
wherein the right temple tip projects away from the right temple in a direction away from the translucent plate and in a direction towards the inferior direction.

8. The optical device according to claim 7
wherein the left temple slot runs from the superior edge of the left temple towards the inferior edge of the left temple;
wherein the left temple slot does not go through the inferior edge of the left temple;

wherein the right temple slot runs from the superior edge of the right temple towards the inferior edge of the right temple;
  wherein the right temple slot does not go through the inferior edge of the right temple.
9. The optical device according to claim 8 wherein the left blinder and the right blinder are identical structures.
10. The optical device according to claim 9
  wherein the nose frame comprises a bridge, a left nose pad, and a right nose pad;
  wherein the left nose pad is attached to the bridge;
  wherein the right nose pad is attached to the bridge;
  wherein the bridge is further defined with a left end and a right end;
  wherein the left end is the end of the bridge that attaches to the left blinder;
  wherein the right end is the end of the bridge that attaches to the right blinder.
11. The optical device according to claim 10 wherein the bridge is a linear structure formed from a rigid material.
12. The optical device according to claim 11
  wherein the bridge is formed with a left arcuate and a right arcuate;
  wherein the left arcuate is an arcuate curvature that bends the bridge below the left eye of the wearer such that the left arcuate will not interfere with forward vision;
  wherein the right arcuate is an arcuate curvature that bends the bridge below the right eye such that the right arcuate will not interfere with the forward vision.
13. The optical device according to claim 12
  wherein the translucent plate is inserted into the left temple slot of the left temple such that the sense of direction of the plate width of the translucent plate is perpendicular to the left temple;
  wherein the translucent plate is inserted into the right temple slot of the right temple such that the sense of direction of the plate width of the translucent plate is perpendicular to the right temple;
  wherein the temple span is an adjustable span of the distance in the direction of the plate width between the left blinder and the right blinder;
  wherein the temple span is adjustable by sliding the left blinder and the right blinder along the plate width of the translucent plate.
14. The optical device according to claim 1 wherein the front lens has an optical property selected from the group consisting of UV filtering, a polarizing filter, or a tint that only allows the passage of light of a previously determined range of wavelengths.
15. The optical device according to claim 14
  wherein the left blinder is a side piece that is attached to the front lens;
  wherein the right blinder is a side piece that is attached to the front lens;
  wherein the left blinder is an opaque plate structure;
  wherein the right blinder is an opaque plate structure;
  wherein the left blinder comprises a left temple, a left temple tip, and a left temple slot;
  wherein the left temple tip attaches to the left temple;
  wherein the left temple slot is formed in the left temple;
  wherein the left temple attaches to the translucent plate;
  wherein the right blinder comprises a right temple, a right temple tip, and a right temple slot;
  wherein the right temple tip attaches to the right temple;
  wherein the right temple slot is formed in the right temple;
  wherein the right temple attaches to the translucent plate;
  wherein the left temple is the frustum of a left triangular structure wherein a vertex of the left triangular structure is removed;
  wherein the line removing the vertex of the triangular structure is parallel to the edge of the left triangular structure that is distal from the vertex of the left triangular structure that is removed;
  wherein the right temple is the frustum of a right triangular structure wherein a vertex of the right triangular structure is removed;
  wherein the line removing the vertex of the triangular structure is parallel to the edge of the right triangular structure that is distal from the vertex of the right triangular structure that is removed;
  wherein the left temple tip is a rectilinear structure that is attached to the line that removes the vertex of the left temple;
  wherein the right temple tip is a rectilinear structure that is attached to the line that removes the vertex of the right temple;
  wherein the left temple tip projects away from the left temple in a direction away from the translucent plate and in a direction towards the inferior direction;
  wherein the right temple tip projects away from the right temple in a direction away from the translucent plate and in a direction towards the inferior direction;
  wherein the left temple slot runs from the superior edge of the left temple towards the inferior edge of the left temple;
  wherein the left temple slot does not go through the inferior edge of the left temple;
  wherein the right temple slot runs from the superior edge of the right temple towards the inferior edge of the right temple;
  wherein the right temple slot does not go through the inferior edge of the right temple.
16. The optical device according to claim 15
  wherein the nose frame comprises a bridge, a left nose pad, and a right nose pad;
  wherein the left nose pad is attached to the bridge;
  wherein the right nose pad is attached to the bridge;
  wherein the bridge is further defined with a left end and a right end;
  wherein the left end is the end of the bridge that attaches to the left blinder;
  wherein the right end is the end of the bridge that attaches to the right blinder;
  wherein the bridge is formed with a left arcuate and a right arcuate;
  wherein the left arcuate is an arcuate curvature that bends the bridge below the left eye of the wearer such that the left arcuate will not interfere with forward vision;
  wherein the right arcuate is an arcuate curvature that bends the bridge below the right eye such that the right arcuate will not interfere with the forward vision.
17. The optical device according to claim 16
  wherein the translucent plate is inserted into the left temple slot of the left temple such that the sense of direction of the plate width of the translucent plate is perpendicular to the left temple;
  wherein the translucent plate is inserted into the right temple slot of the right temple such that the sense of direction of the plate width of the translucent plate is perpendicular to the right temple;
  wherein the temple span is an adjustable span of the distance in the direction of the plate width between the left blinder and the right blinder;

wherein the temple span is adjustable by sliding the left blinder and the right blinder along the plate width of the translucent plate;
wherein the translucent plate is colored.

18. The optical device according to claim 17
wherein the left nose pad is a silicon nose pad;
wherein the right nose pad is a silicon nose pad.

* * * * *